(12) United States Patent
Arkko et al.

(10) Patent No.: US 9,992,673 B2
(45) Date of Patent: Jun. 5, 2018

(54) DEVICE AUTHENTICATION BY TAGGING

(71) Applicant: Telefonaktiebolaget L M Ericsson (publ), Stockholm (SE)

(72) Inventors: Jari Arkko, Kauniainen (FI); Fredrik Garneij, Gothenburg (SE); Jan Melen, Espoo (FI); Mats Sagfors, Kyrkslatt (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 341 days.

(21) Appl. No.: 13/722,227

(22) Filed: Dec. 20, 2012

(65) Prior Publication Data
US 2014/0171027 A1    Jun. 19, 2014

(30) Foreign Application Priority Data

Dec. 19, 2012 (EP) .................. PCT/EP2012/076055

(51) Int. Cl.
*H04W 12/06* (2009.01)
*H04L 29/06* (2006.01)

(52) U.S. Cl.
CPC ......... *H04W 12/06* (2013.01); *H04L 63/0853* (2013.01)

(58) Field of Classification Search
None
See application file for complete search history.

(56) References Cited

U.S. PATENT DOCUMENTS 9,271,148 B2 * 2/2016 Bone .................. H04L 63/0853
2002/0169966 A1 11/2002 Nyman et al.
(Continued)

FOREIGN PATENT DOCUMENTS

CN 102480727 A 5/2012
CN 102577459 A 7/2012
(Continued)

OTHER PUBLICATIONS

International Search Report and Written Opinion issued in International Application No. PCT/EP2012/076055 dated Aug. 21, 2013, 10 pages.
Office Action dated Oct. 18, 2016, issued in Japanese application serial No. 2015-548219 (with English translation), 8 pages.
First Chinese Office Action issued in Chinese Application No. 2012800778252 dated May 18, 2017, with English Translation, 20 pages.
Search Report dated May 9, 2017, issued in Chinese Patent Application No. 2012800778252, with English Translation, 4 pages.
(Continued)

*Primary Examiner* — Mazda Sabouri
(74) *Attorney, Agent, or Firm* — Rothwell, Figg, Ernst & Manbeck, p.c.

(57) ABSTRACT

The invention relates to a method for authenticating a device, comprising a network communication unit and tagging circuit, in a mobile communication network, using a mobile entity comprising a tagging circuit and being authenticated to the mobile communication network. The method comprises the following steps; the mobile entity establishing a connection with the device, using said tagging circuit, exchanging authentication data between the mobile entity and the device using the tagging circuit and authenticating the device to the mobile communication network by submission of exchanged authentication data in the mobile communication network. Thereby, the permissions of a mobile entity may be shared with another device by tagging. The invention also relates to a corresponding mobile entity, device, node and computer program product.

7 Claims, 10 Drawing Sheets

(56) References Cited

U.S. PATENT DOCUMENTS

| | | | |
|---|---|---|---|
| 2005/0021940 A1* | 1/2005 | Ma | 713/155 |
| 2005/0026595 A1* | 2/2005 | Huckins | H04L 63/0492 |
| | | | 455/411 |
| 2007/0077966 A1* | 4/2007 | Huang | H04W 12/06 |
| | | | 455/558 |
| 2008/0209522 A1* | 8/2008 | Ephraim | H04L 63/08 |
| | | | 726/4 |
| 2008/0267407 A1* | 10/2008 | Vanderveen | H04L 9/083 |
| | | | 380/277 |
| 2009/0199001 A1 | 8/2009 | Barriga et al. | |
| 2011/0088087 A1* | 4/2011 | Kalbratt | G06Q 20/02 |
| | | | 726/7 |
| 2012/0047551 A1 | 2/2012 | Pattar et al. | |
| 2013/0110728 A1* | 5/2013 | Kobres | G06Q 30/06 |
| | | | 705/75 |
| 2014/0351596 A1* | 11/2014 | Chan | 713/170 |

FOREIGN PATENT DOCUMENTS

| | | |
|---|---|---|
| EP | 1487228 A2 | 12/2004 |
| JP | 2012173866 A | 9/2012 |
| WO | 2012035335 A1 | 3/2012 |

OTHER PUBLICATIONS

European Communication dated Sep. 4, 2017, issued in European Patent Application No. 12 812 216.5, 7 pages.
Second Office Action in Chinese application serial No. 2012800778252 dated Jan. 2, 2018, 11 pages.

* cited by examiner

DEVICE AUTHENTICATION BY TAGGING

TECHNICAL FIELD

The present invention relates to the field of authentication of devices e.g. Machine to Machine, M2M, devices in a mobile communication network. In particular it relates to a method and apparatus for authenticating a device in a mobile communication network using a mobile entity being attached to the mobile communication network.

BACKGROUND

While traditional 2G mobile telephony is used mainly for wireless communication of circuit-switched voice calls, the 3G mobile telephony has been developed to support wireless communication of packet-switched multimedia sessions using IP, Internet Protocol. For example, the communication protocols used for General Packet Radio Service, GPRS, and Universal Mobile Telecommunications System, UMTS, support packet-switched multimedia services. A user subscribing to a 2G or 3G mobile access network is typically obliged to have a physical Subscriber Identity Module, SIM, or similar installed in his/her communication terminal, in order to obtain connectivity with the network. The SIM is thus tied to a mobile subscription and holds a subscription identity and various associated security parameters which the terminal must use when registering with the network in order to gain access and connectivity. The SIM card can be moved between different devices.

Recently, it has also been discussed to implement so-called "Soft SIM"s, where the traditional SIMs becomes embedded into a device and remotely provisioned or activated. The subscriber identity and subscriber identification would then be enabled without using a physical and removable SIM card.

In addition, Machine-to-machine, M2M, communication over mobile and wireless networks is expected to become increasingly important in the future. Examples of possible M2M applications are almost countless e.g. in private cars for communicating service needs, in water or electricity meters for remote control and/or remote meter reading, in street-side vending machines for communicating when goods are out-of-stock or when enough coins are present to justify a visit for emptying, in taxi cars for validating credit cards, in surveillance cameras for home or corporate security purposes etc.

However, because the subscription identity is tied to a physical module, i.e. the SIM, connection of multiple devices generally requires one SIM for each device mentioned above. Therefore, the operators generally offer the possibility to have several SIMs connected to one user subscription. However, such a solution is not that convenient to the user, because several SIMS needs to be handled. When the user buys a new device a new SIM has to be ordered, or moved from another device. This problem will increase with the number of devices that a single user wishes to attach to the mobile communications network.

Furthermore, today cellular networks provide wide-area connectivity to M2M devices, but competing short-range radio standards such as Wireless Local Area Network, WLAN or ZigBee that allow local area connectivity to a mobile communication network at a usually lower power consumption are not that frequently available, even if increased use of local networks would offload the cellular networks.

One problem with such deployments is that there is no economic benefit to providing free service. Hence, to make it profitable, the M2M devices should be authenticated somehow and their usage billed through their owner's subscription. However, it is difficult to acquire and install SIM cards in all of the devices one wishes to connect to a mobile communication network. And other forms of authentication are often impractical as well.

One known solution to the authentication problem is using a mesh routing solution. A mesh routing solution makes it possible to connect aggregated devices to a short-range radio cloud using at least one aggregating device connected directly to a base station. However, meshed devices are generally not seen from the network, therefore such a solution is not always desirable.

SUMMARY

With the above description in mind, an aspect of the present invention is to provide a method for authenticating devices in a mobile communication network, which seeks to mitigate, alleviate, or eliminate one or more of the above-identified deficiencies and/or disadvantages in the art singly or in any combination.

The present invention is defined by the appended independent claims. Various advantageous embodiments of the invention are set forth by the appended dependent claims as well as by the following description and the accompanying drawings.

The invention provides for a method for authenticating a device, comprising a network communication unit and tagging circuit, in a mobile communication network, using a mobile entity comprising a tagging circuit and being authenticated to the mobile communication network. The method comprises the following steps; the mobile entity establishing a connection with the device, using said tagging circuit, exchanging authentication data between the mobile entity and the device using the tagging circuit and authenticating the device to the mobile communication network by submission of exchanged authentication data in the mobile communication network. Thereby, permissions of a mobile entity in the communication network are shared with another device by tagging. Hence, it would be possible to attach a device without a SIM or "SoftSIM" to a mobile communications network.

According to one aspect of the invention the mobile entity is associated with a user subscription for communication with the mobile communication network and said authentication enables the device to use the same subscription. Hence, a user may attach several devices to the mobile communication network simultaneously using only one SIM. Thereby, there is no need to move the SIM between a user's devices.

According to one aspect of the invention the tagging circuit is near field communication means. Then the only user interaction required for establishing a connection between the device and the mobile entity is to bring the devices in close proximity. Hence, permissions are shared in a simple and user friendly manner.

According to one aspect of the invention the authentication data is only valid for a predefined time. This provides an increased security, because if a tagging is hijacked, the authentication data and thus the access to the subscription is only usable for a limited time.

According to one aspect of the invention it relates to a mobile entity adapted to communicate with a mobile communication network. The mobile entity comprises a tagging circuit, a network communication unit configured to communicate with said mobile communication network and a processing unit configured to establish a connection between the mobile entity and a device and exchange authentication data between the device and the mobile entity, using said tagging circuit; whereby authentication of said device to the mobile communications network is enabled by submission of the exchanged authentication data in the mobile communication network.

According to one aspect of the invention it relates to a device comprising means for communicating with a mobile communication network. The device comprises a tagging circuit, a network communication unit configured to communicate with said mobile communication network, a processing unit configured to establish a connection between the device and a mobile entity and exchange authentication data between the device and the mobile entity, using said tagging circuit, whereby authentication of said device to the mobile communications network is enabled by submission of the exchanged authentication data in the mobile communication network.

According to one aspect of the invention it relates to a computer program product comprising instructions that when executed by a processing unit in mobile entity, forces the mobile entity to perform the method steps defined the method.

According to one aspect of the invention it relates to a node in a mobile communication network comprising; a network communication unit configured to retrieve authentication data exchanged between a mobile entity being authenticated to the mobile communication network and an authenticator adapted to authenticate said device to the mobile communications network, by verifying said authentication data which is associating said device with said mobile entity.

With the above description in mind, the object of the present invention is to overcome at least some of the disadvantages of known technology as previously described.

BRIEF DESCRIPTION OF THE DRAWINGS

The present invention will be more readily understood through the study of the following detailed description of the embodiments/aspects together with the accompanying drawings, of which.

It should be added that the following description of the embodiments is for illustration purposes only and should not be interpreted as limiting the invention exclusively to these embodiments/aspects.

DETAILED DESCRIPTION

The various steps described below in connection with the figures should be primarily understood in a logical sense, while each step may involve the communication of one or more specific messages depending on the implementation and protocols used. The shown units are also to be understood logically without limitation to possible implementation in practice.

The general concept of the present disclosure is to use a mobile entity, ME, such as a smart phone, that has a SIM card or a "Soft SIM", which is associated with a subscription, and has tagging capability e.g. Near Field Communication, NFC, or Radio-Frequency Identifier, RFID, for attaching devices to a mobile communication network. In this way, devices can be tagged as "owned" by the mobile entity. This tagging may be registered both in the device and in a network database. Subsequently, the device can request access to the mobile communication network via a base station e.g. a pico- or femto-basestation.

A device referred to in this application could be any device capable of communicating with a mobile communications network. Examples of such devices are of course mobile phones, smartphones, laptops and M2M devices etc. However, one must appreciate that mobile communication capability could be built in almost any device e.g. a car, a lamp post, a scale and so on.

A mobile entity referred in this application could be any mobile device having a SIM interface, a location for a SIM module, or support for "Soft SIM", and cellular communication capabilities e.g. a mobile phone, smartphone, tablet, computer or M2M device.

The present invention is applicable also for such future implementations, where a user subscription can be adequately authenticated without the physical SIM card. For simplicity and clarity, we will use the term SIM card, but it should be understood that this is by no means limiting the applicability of this invention.

The term tagging refers in this application to any application where the peer-to-peer authentication could take place. Above NFC and RFID are referred, where the proximity of the devices secures that the devices belong together. However, other examples of tagging are using WLAN, Bluetooth® or Zigbee or any other device-to-device communication.

Hence, in one aspect of the invention, the authenticity of the pairing is ensured by the fact that the user brings the ME and the device close together. An alternative solution is that the pairing is performed by e.g. Zigbee, Bluetooth or WiFi, in which case there is be a need for other methods to pair the devices together. For example, the pairing could be performed by a user that authenticates the pairing between the ME and device by manually accepting the pairing on a user interface of at least one of the devices. Such manual pairing could be associated with a password exchange or other user-action that verifies that the pairing is intended and rightfully wanted.

The identity referred to in this application may also have many forms, in principle addressing information by which the device can be identified. Examples are a MAC identity, a Radio Network temporary Identity, RNTI, Temporary TIMSI or username.

The invention will now be described with reference to a user using a mobile entity to authenticate a device, typically a device like a laptop, using a tagging circuit which is here embodied as NFC.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

Figure 1:
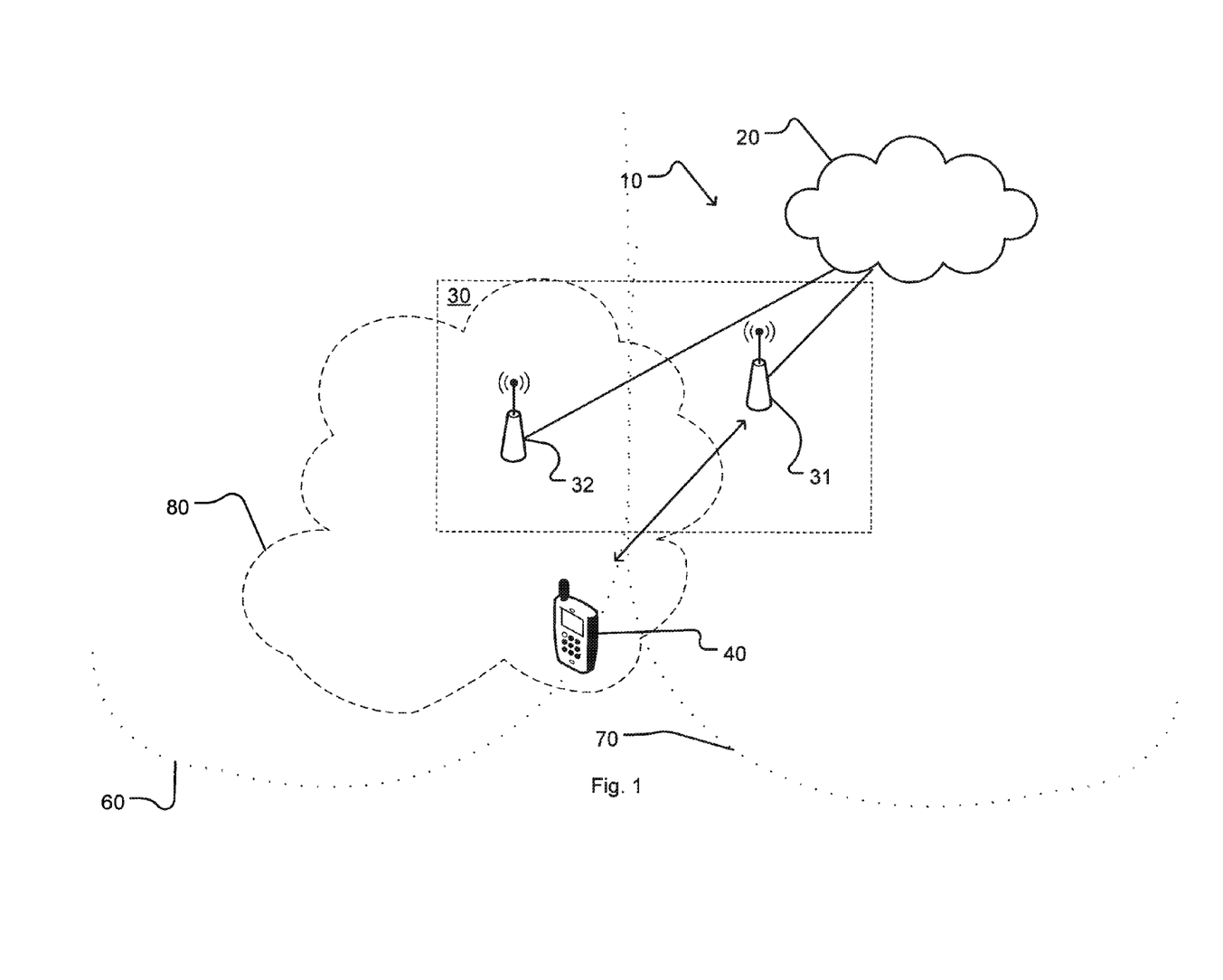
FIG. 1 schematically illustrates a mobile communication network.

FIG. 1 illustrates schematically a mobile communication network 10, where the method of authenticating a device according to one aspect of the invention may be executed. The mobile communication network may be any type of public network providing any services to a mobile entity 40 involving a connection and the communication of signals and data, such as a mobile access network using, e.g., GSM, UMTS, GPRS or LTE standards. The mobile communication network comprises a core network 20 and a radio access network 30. The radio access network 30 comprises one or several base stations 31, 32.

The core network 20 provides various services to customers who are connected by the access network 30.

For simplicity this illustration only discloses two base stations 31, 32. Each base station defines a cell 60, 70. It should be understood that a base station often controls multiple cells, so the illustration with a single cell per base station is by no means limiting and only illustrated to retain clarity. Base station 31, 32 are a regular base stations e.g. a Node Bs, defining two cells 60, 70.

In conjunction with base station 32 a short range base station is deployed defining a short-range network 80 e.g. WLAN. As the base stations 31, 32 are deployed in any case, adding short-range radio support provides a new type of connectivity at a reasonable cost.

Figure 2:
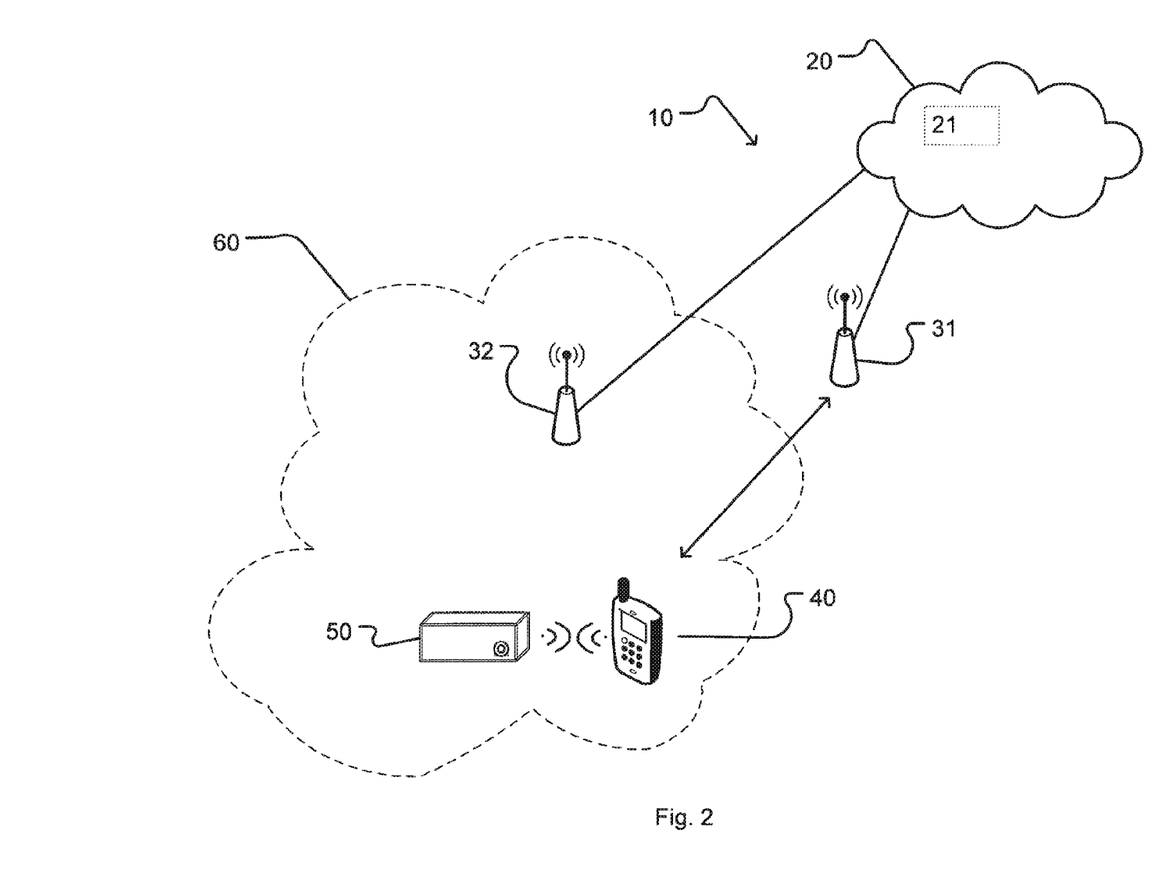
FIGS. 2 and 3 schematically illustrates authentication of a device in the mobile communication network.
Figure 3:
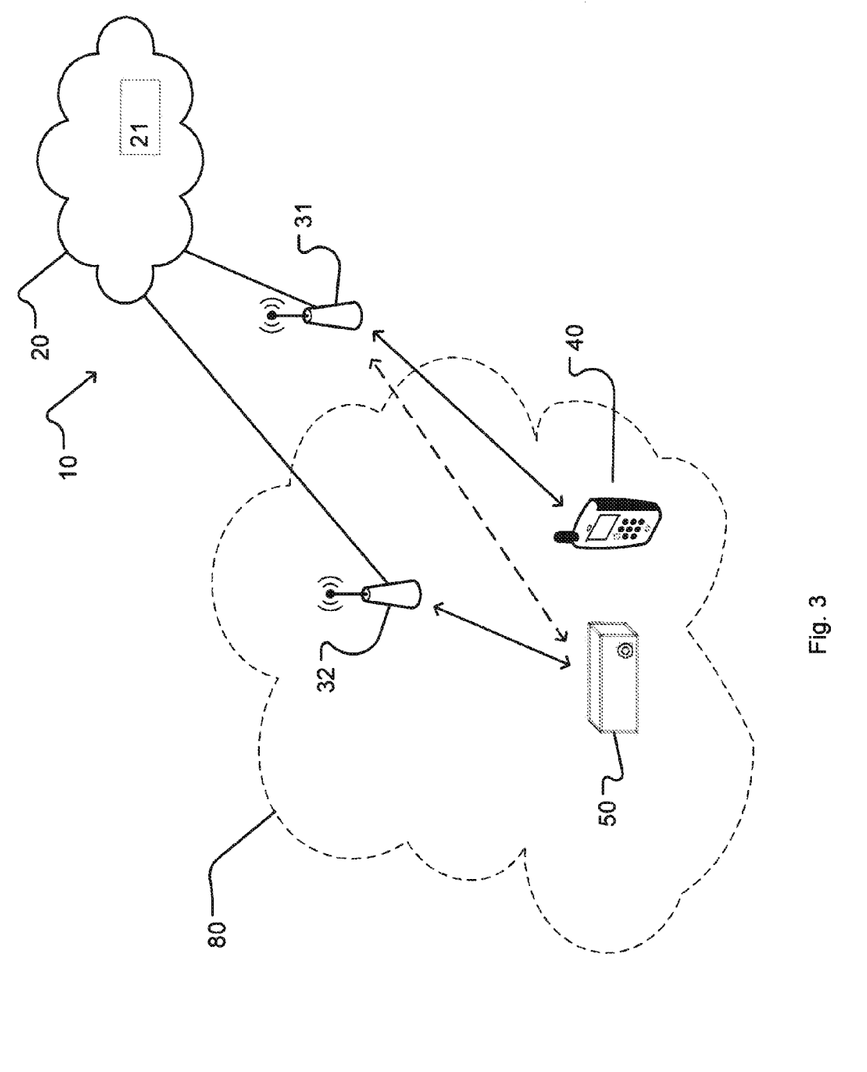

FIGS. 2 and 3 illustrates schematically the procedure of authenticating a device 50 in the mobile communication network 10, e.g. a user having a smartphone 40 which is authenticated to a mobile communication network 10. The user further has a device 50, e.g. a laptop; see FIG. 7 for details of the device 50, with short range capability and a tagging circuit 53. In one embodiment of the invention, the user is informed about the short range network 80 of base station 32 provided by his operator, e.g. by an SMS or a poster. The user then wants to attach the device 50 to the mobile communications network 10 via the short range network 80 of the short range enabled base station 32.

The procedure of authenticating a device is here described with reference to a user using a mobile entity to attach a device to a short range enabled base station 32. However, it should be appreciated that the procedure is as such equally applicable for attaching devices to any base station e.g. cellular base stations of any range.

Figure 7:
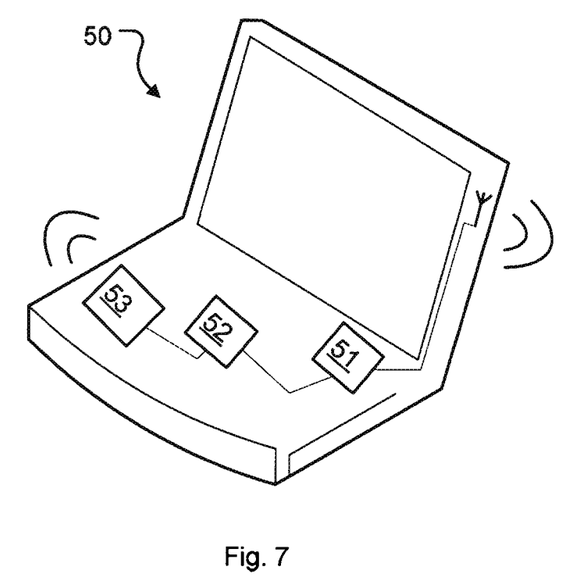
FIG. 7 illustrates a device.

The device 50, disclosed in FIG. 7, comprises a network communication unit 51 and tagging circuit 53. The mobile entity 40 is authenticated to the mobile communication network 20. In this example the mobile entity is attached to the mobile communications network using base station 31. The authentication is initiated by the mobile entity 40 which establishes a connection with the device 50, using said tagging circuit 53, as shown in FIG. 2. In this example the tagging circuit is a NFC tagging circuit 53. When using NFC the connection is initiated by bringing the mobile entity 40 in close proximity of the device 50.

When the mobile entity 40 has established a connection with the device 50 authentication data is exchanged between the mobile entity and the device using the tagging circuit 53.

According to one aspect of the invention, a network identifier is also exchanged. The network identifier is information defining the network to authenticate to. The network identifier could specify an operator, a particular network, a domain or a cell of a cellular network.

The device 50 is then authenticated to the mobile communication network 20 by submission, by the mobile entity 40, of authentication data exchanged between the mobile entity 40 and the device 50.

For example the authentication data is exchanged by the mobile entity 50 retrieving an identity, such as a MAC address, through which the device 50 can be identified, from the device 50. The mobile entity 40 then submits the authentication data by sending said identity to the network 10 for registration, whereby access to the short range network is enabled using e.g. a MAC filter.

Thereafter connection between the device 50 and the mobile communication network 20 can be established using said network communication unit to attach to the short range network 80 of base station 32, as shown in FIG. 3. Connection could also be established to the same base station 31 as the mobile entity 40 is connected to. Connection can also be established with another base station within the mobile communication network. A prerequisite is of course that the device comprises communication means for attaching to the base station.

By using a mobile entity 40 associated with a user subscription for communication with the mobile communication network 10 to tag a device 50 as described above, the device is enabled to use the same subscription as the mobile entity 40. However, according to one aspect of the invention, the authentication is tied to a user, an entity or a domain, whereby the permissions may be shared in the same manner. For example in the case of a short range enabled base station 32 of FIG. 1, the permissions may only authenticate a device in that particular short range cell.

Figure 4:
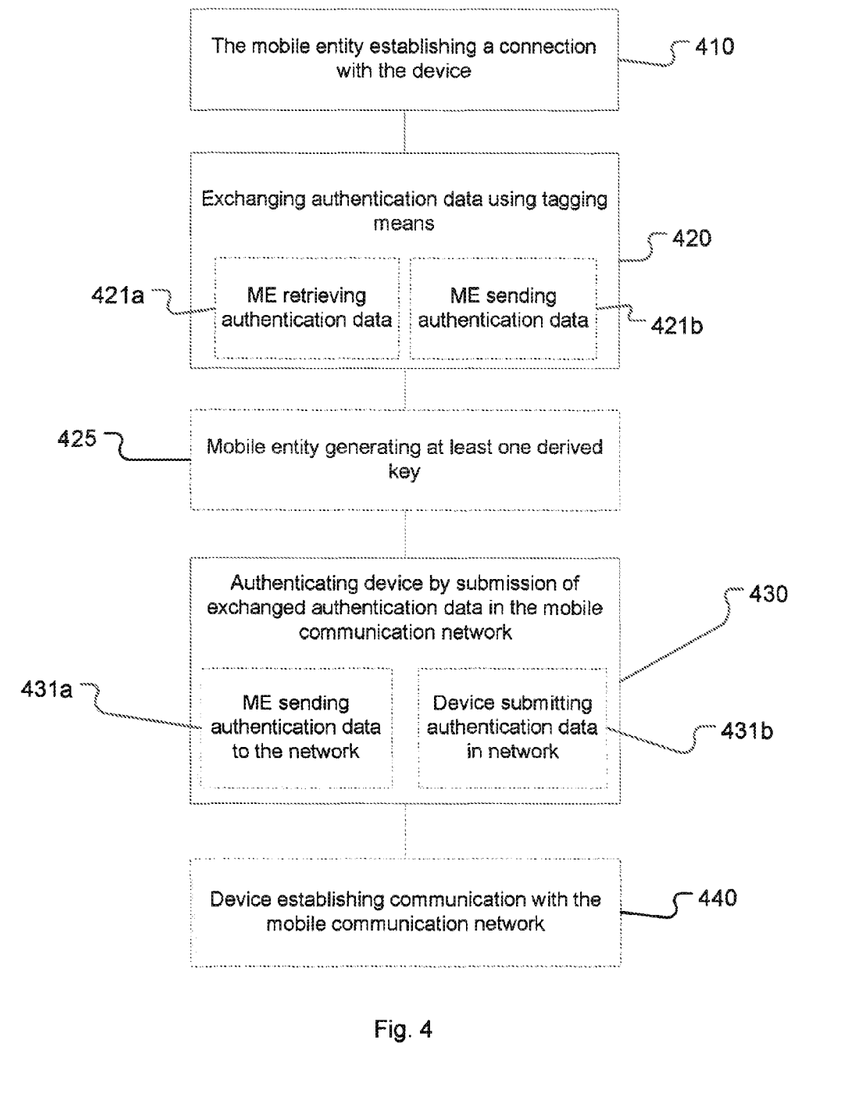
FIG. 4 is flowchart illustrating embodiments of method steps for authenticating a device.

FIG. 4 is a flowchart illustrating the method steps of the method for authenticating a device, comprising a network communication unit and tagging circuit, in a mobile communication network, using a mobile entity comprising a tagging circuit and being authenticated to the mobile communication network.

In the first step 410, the mobile entity establishes 410 a connection with the device, using said tagging circuit. The tagging circuit is any wireless means suitable for establishing a connection between a device and a mobile entity. If the tagging circuit is an NFC tagging circuit 53, the connection is established by bringing the mobile entity 40 in close proximity of the device 50.

According to one aspect of the invention, the tagging circuit 53 is a Bluetooth circuit. The connection is then established by pairing the mobile entity 40 with the device 50 according to the Bluetooth® standard.

According to one aspect of the invention, the tagging circuit is a WLAN circuit. The connection is then established by connecting the mobile entity 40 to the device 50 using any suitable security scheme, e.g. WEP.

In the next step, authentication data is exchanged 420 between the mobile entity and the device using the tagging circuits 43, 53. Then the device is authenticated 430 to the mobile communication network by submission of exchanged authentication data in the mobile communication network. The submission is either performed directly after the data exchange, like a registration of the device in the mobile communications network 10 or the submission is made when the device 50 attempts to attach to the mobile communication network 10 for the first time.

According to one aspect of the invention, the authentication data is exchanged by the mobile entity retrieving 421a an identity, through which the device is be identified, from said device 50, e.g. a MAC address as described above. Authentication is then performed by sending 431*a* said identity to the network.

According to one aspect of the invention, the authentication data is exchanged by the mobile entity sending 421*b* the authentication data to said device for submission 431*b* in the mobile communication network. The authentication data is then e.g. an identity or a user name. The authentication data may further comprise a password.

When authentication has been done, the device may establish 440 communication with the mobile communication network.

According to one aspect of the invention, the authentication is registered both in the device and in a network database in a network node, e.g. a database run by the operator that has provided the SIM card for the mobile entity. Subsequently, the device can request access to the mobile communication network via a base station.

Which base station to attach to and how, is e.g. defined in a network identifier exchanged with the authentication data. According to one aspect of the invention, the registration gives the device access to further base stations of the network using the subscription of the mobile entity. In principle the device may have the same permissions as the mobile entity.

If the authentication data is an identity and a password, access is requested by submitting the identity and password.

The request to access is e.g. triggered by the device finding itself near a base station indicated by the network identifier. Access is either direct or through a set of intervening short-range radio routers.

According to one aspect of the invention, the authentication is only valid for a predefined time. The time is e.g. specified by the mobile entity or by the mobile communication network. The time is typically being between a few minutes up to days, weeks or years.

When a tagged device 50 is attached to the mobile communication network 10, the access costs may be billed to the mobile entity owner's subscription.

According to one aspect of the invention, the user is only allowed to tag and use a limited number of devices with a subscription at the same time. Then, it may be useful to define a maximum time that a device can use the subscription, to allow tagging of another device when the previous tagging and authentication is released.

Using a MAC address as authentication data, as described in connection with FIGS. 2 and 3, is a very simple way of implementing the invention. There are several other possibilities. In one embodiment, illustrated in the signaling diagram of FIG. 5*b*, the exchanged authentication data is an identity e.g. a Network Access Identifier as defined by the Extensible Authentication Protocol Method for 3rd Generation Authentication and Key Agreement, EAP-AKA.

Figure 5A:
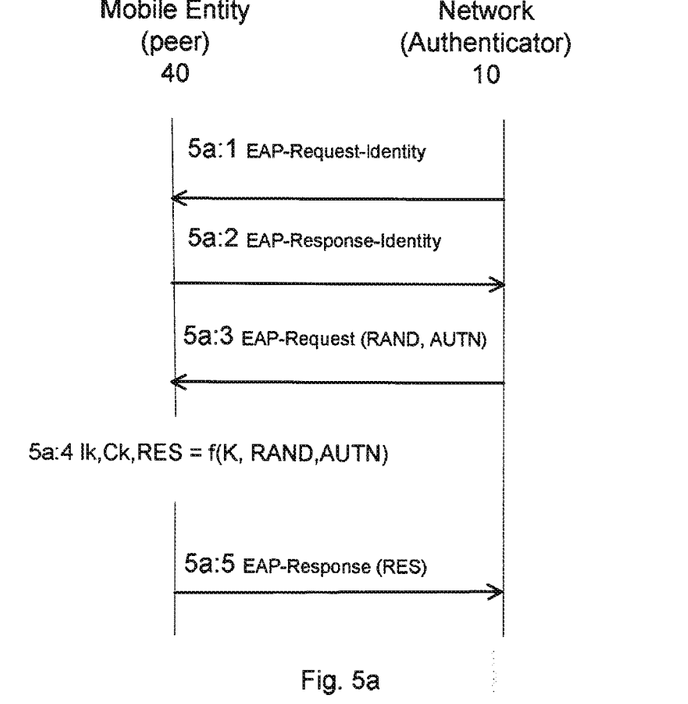
FIG. 5a is a signaling diagram illustrating EAP AKA as used in a 3G network.

Existing standards for mobile networks provide for protection of communication between a serving network and a mobile entity based on a security context created as a result of successful Authentication and Key Agreement, AKA. For example, AKA is the mechanism used to perform authentication and session key distribution in UMTS and LTE networks. AKA requires that a long-term shared secret key K is stored in the mobile entity e.g. USIM card and an authentication server, AS, for example a Home Subscriber Server, HSS, in the home network of the mobile entity. The basic principle is described in FIG. 5*a* as the following:

The network requests the identity from the mobile entity, 5*a*:1. In response the mobile entity sends 5*a*:2 a subscriber/mobile entity identity e.g. International Mobile Subscriber Identity, IMSI.

Based on the identity, the serving network, using the mobile entity's identity, requests the following data from the AS, not shown in the figure: a random challenge, RAND: an authentication token, AUTN, an expected response, XRES and a set of keys. These keys correspond in UMTS to Ck, Ik, see below.

The random challenge, RAND, and the authentication token, AUTN, which provides replay protection and enables the mobile entity to authenticate the network, are sent 5*a*:3 to the mobile entity via the serving network.

The USIM at the mobile entity verifies AUTN and computes two values from RAND: a set of keys, Ck and Ik, and a response, RES, 5*a*:4.

RES is sent 5*a*:5 back to the serving network, which verifies that the response RES is as expected, i.e. it matches XRES, and, if so, draws the conclusion that it has been received from the expected sender. If so, the mobile entity is considered authenticated and subsequent data exchange is protected using the set of keys.

AKA thus creates fresh session keys Ck and Ik used for security communication between the mobile entity and serving network.

Figure 5B:
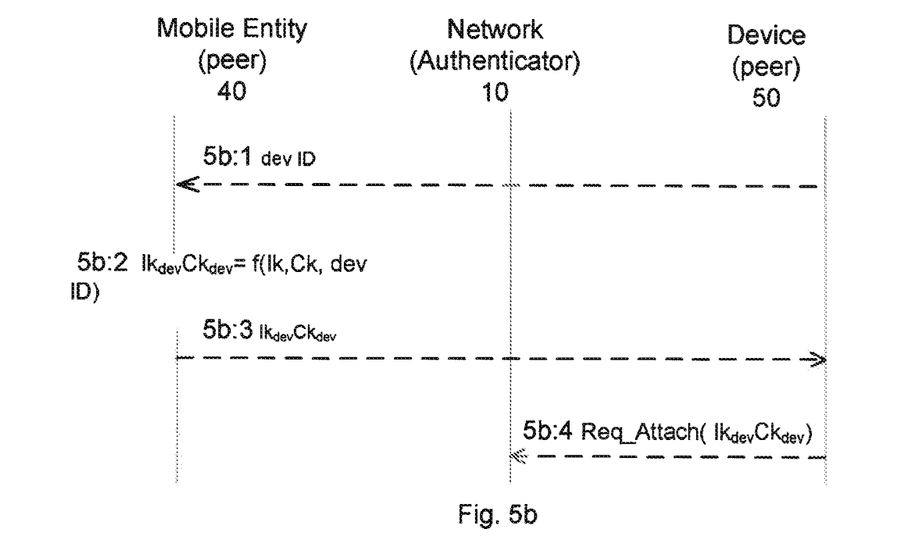
FIGS. 5b and 5c are signaling diagrams illustrating exchange of signals in a mobile communication network.

The embodiments illustrated in FIGS. 5*a* and 5*b* are based on Authentication and Key Agreement e.g. EAP AKA. However, the principle is not limited thereto, but may be implemented using any authentication protocol based on a shared secret. These embodiments could be used independent on the tagging circuit used and also independently on the type of communication used to attach the device 50 to the mobile communication network. However, the examples are based on the 3G implementation using Ck and Ik as mentioned above, even though any keys may be shared using this principle. Such keys include e.g. the authentication and encryption keys derived according to the principles defined e.g. in TS 33.401, including keys derived from $K_{ASME}$, such as $K_{eNB}$, $K_{NASint}$, $K_{NASenc}$, $K_{UPenc}$, $K_{RRCint}$ and $K_{RRCenc}$.

In a first embodiment illustrated in FIG. 5*b*, the mobile entity is authenticated to the network using EAP-AKA as described in FIG. 5*a*. Hence, the mobile entity has a pair of authentication keys Ik and Ck. The exchange is based on the mobile entity generating, step 425 in FIG. 4, at least one derived key for submission to the mobile communication network.

In the first step the mobile entity 40 retrieves 5*b*:1 a device identity, from the device 50. The identity may be a MAC address, an RNTI, International Mobile Subscriber Identity, TIMSI, IMEI or IMSI. In the next step, the mobile entity generates, at least one derived key, in this case Ckdev and Ikdev. The at least one key is calculated 5*b*:2 from the authentication key of the mobile entity and the retrieved identity of the device. In the next step 5*b*:3 the mobile entity sends said at least one derived key, Ckdev and Ikdev, to the device 50 for submission to the mobile communication network. The at least one derived key, Ckdev and Ikdev, enables the device 50 to authenticate to the mobile communication network 10. This is done by the device 50 by sending 5*b*:4 a request to attach to the mobile communication network comprising said at least one derived key. According to one aspect of the invention, the message 5*b*:3 contains a network address or a domain name where the authentication is to be validated. The network address is e.g.

the address that the device should send the message 5b:4 to. The domain may e.g. be an area identification where the authentication is valid, such as a network name, domain name, operator name or similar. It may also include e.g. information that the authentication is valid over a certain access technology, such as e.g. a WiFi network in a hotel, or a corporate network implementing a particular technology. These domains and area restrictions with alternatives are listed as examples, and should not constrain the applicability of the current invention.

Figure 5C:
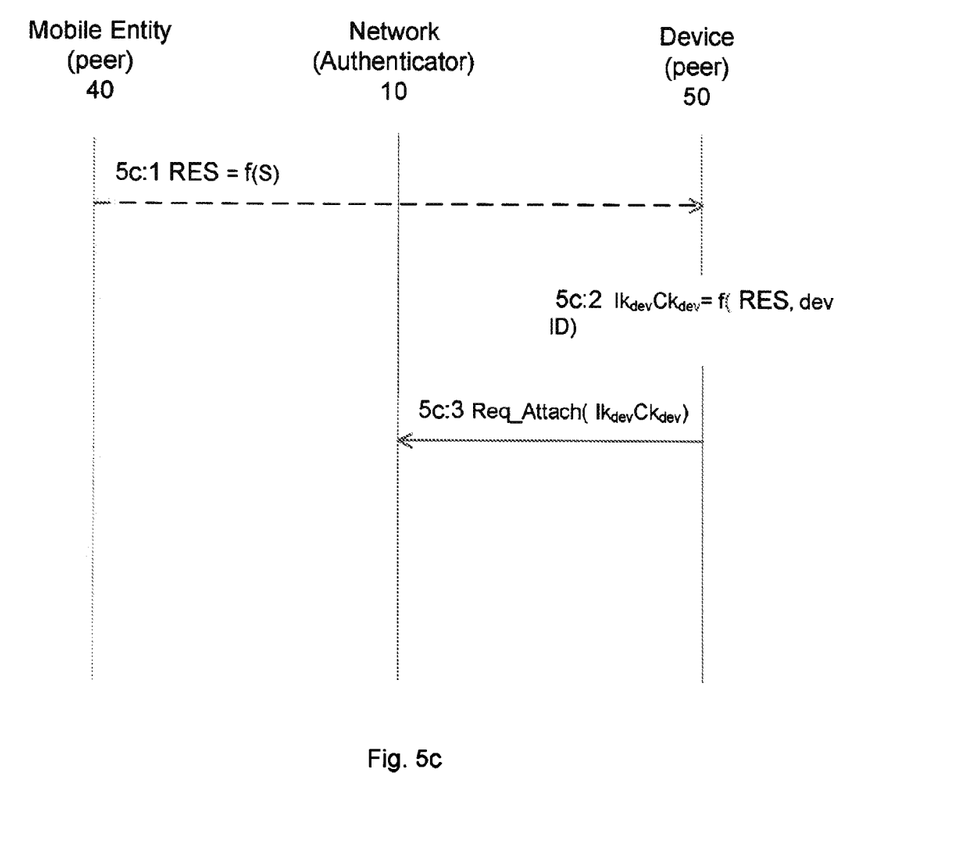

An alternative embodiment is illustrated in the signaling diagram of FIG. 5c. This approach differs from the embodiment of FIG. 5b in that the device 50 does not need to send its identity to the mobile entity. The mobile entity is authenticated to the network using a standard AKA as described in FIG. 5a. These steps may have been executed when the mobile entity was first connected to the mobile communications network 10. In this embodiment, the derived key is calculated in two steps, the first step comprises using a one-way function f(S) that takes the long-term shared secret K that the mobile entity shares with the operator as input. The result RES is sent 5c:1 to the device 50. Also in this case, the message sent to the device may include addressing and domain information, as already described in conjunction with the previous figure.

The second step comprises of using a function 5c:2 that takes the result of the first function and the identity of the device as input, for calculating a derived set of authentication keys, Ckdev and Ikdev. As in the example above, the at least one derived key, here Ckdev and Ikdev, enables the device 50 to authenticate to the mobile communication network 10. This is done by the device 50 by sending 5c:3 a request to attach to the mobile communication network comprising said at least one derived key.

The embodiments of FIGS. 5b and 5c are examples of how authentication keys may be exchanged using tagging according to the invention using EAP-AKA. However, the invention should not be seen as limited to these examples. In principle any authentication protocol may be used where there is an entity that shares a security key with the ME. For example, it could be the Radio Base Station sharing a key that is derived from a key on the SIM card. Alternatively, any core network node may share another key that is known both by the ME and the corresponding node.

Figure 6:
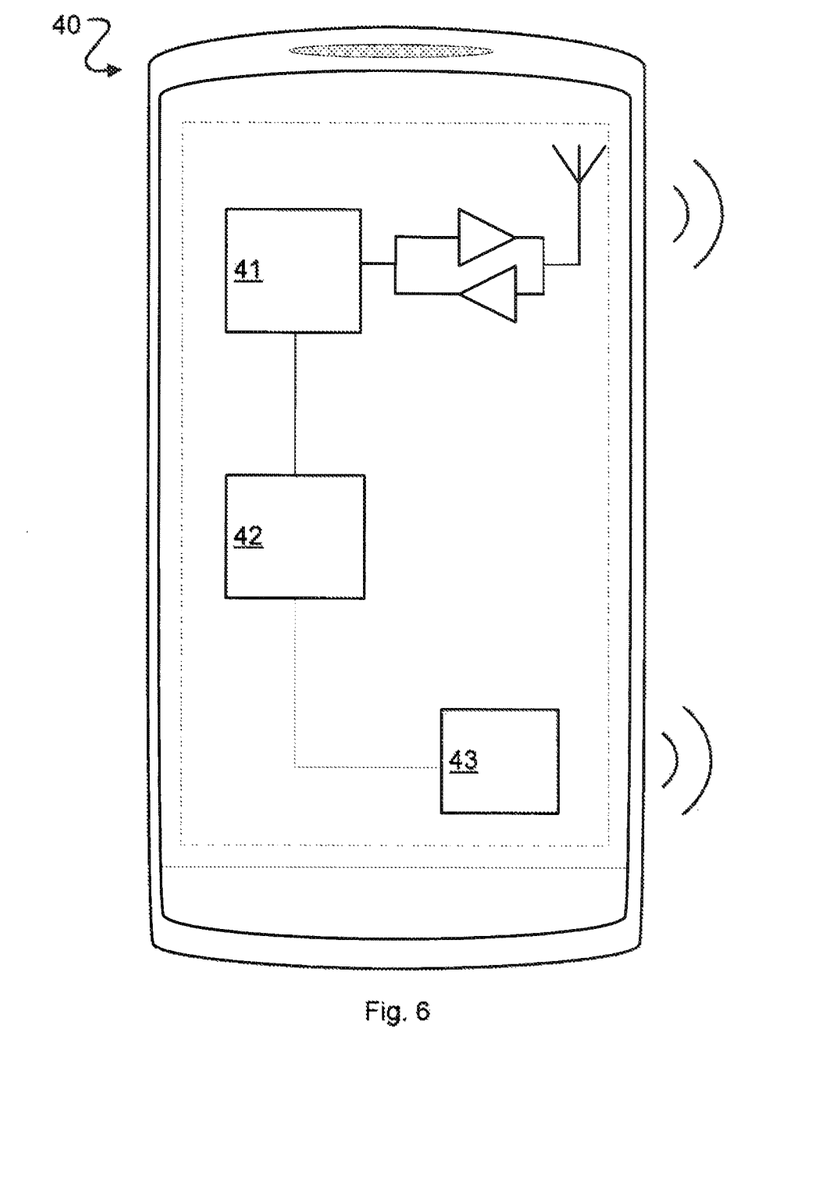
FIG. 6 illustrates a mobile entity.

FIG. 6 illustrates a mobile entity configured to communicate with mobile communication network. The mobile entity comprises a tagging circuit 43, a network communication unit 41 and a processing unit 42.

The tagging circuit 43 may be any circuit configured to tag a device. The tagging circuit may be a near field communication circuit. It may also be a Bluetooth circuit or a RFID circuit.

The network communication unit 41 is configured to communicate with said mobile communication network. The network communication unit may be any wireless communication unit suitable for this purpose such as a short range communication unit, a cellular communication unit or a combination thereof.

The processing unit 42 is configured to execute all the methods described above and below in relation to FIGS. 2-5 and 8. Hence, the a processing unit 42 is configured to establish a connection between the mobile entity and a device and exchange authentication data between the device and the mobile entity, using said tagging circuit 43, whereby authentication of said device to the mobile communications network is enabled by submission of the exchanged authentication data in the mobile communication network. If the mobile entity 50 is associated with a user subscription for communication with the mobile communication network, said authentication data enables the device to use the same subscription.

In yet another aspect of the invention, the mobile entity includes a screen that is configured to display the identity and description of the devices that are currently tagged. The display may show a list of the currently tagged devices and show the number of additional devices that may still be tagged.

According to one aspect of the invention, the mobile entity includes the means to release or remove devices from the list. The user may then interact on the displayed list and select one or several devices to be removed from being allowed to use the subscription. By selecting one or several such devices, and in response to this selection, the mobile entity may send a message to the network to remove the selected device(s) from being allowed to use the subscription.

FIG. 7 illustrates a device 50 comprising means for communicating with a mobile communication network. The device 50 comprises a tagging circuit 53, a network communication unit 51 and a processing unit 52.

The tagging circuit 53 may be any circuit configured to receive tagging information from a mobile entity. The tagging circuit may be a near field communication circuit. It may also be a Bluetooth circuit or a RFID circuit.

The network communication unit 51 is configured to communicate with said mobile communication network. The network communication unit may be any wireless communication unit suitable for this purpose such as a short range communication unit, a cellular communication unit or a combination thereof.

The processing unit 52 is configured to establish a connection between the device and a mobile entity and exchange authentication data between the device and the mobile entity, using said tagging circuit 53; whereby authentication of said device to the mobile communications network is enabled by submission of the exchanged authentication data in the mobile communication network.

The invention also relates to a computer program product comprising instructions that when executed by a processing unit in mobile entity, forces the mobile entity to perform the method as described in this document.

Figure 9:
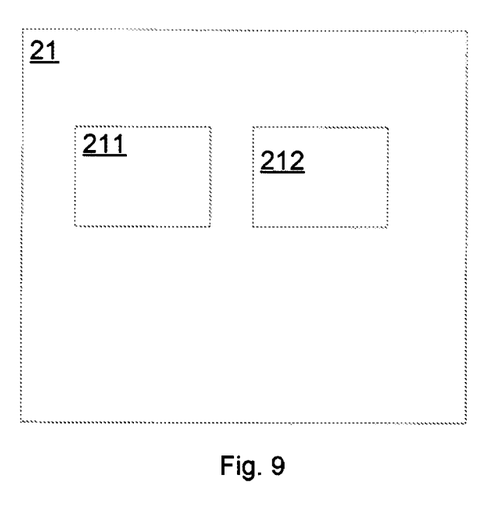
FIG. 9 schematically illustrates a network node.

The invention also relates to a core network node 21, see FIG. 9 in a mobile communication network 10, see FIG. 1. The network node may e.g. be a Mobility Management Entity, MME.

The network node 21 comprises a network communication unit and an authenticator.

The network communication unit 211 is configured to retrieve authentication data exchanged between a mobile entity 40 being authenticated to the mobile communication network.

The authenticator 212 is adapted to authenticate a device 50 to the mobile communications network, through verification of said authentication data which is associating said device 50 with said mobile entity 40. The mobile entity is associated with a user subscription for communication with the mobile communication network and wherein said authentication data authenticates the device to use the same subscription.

Figure 8:
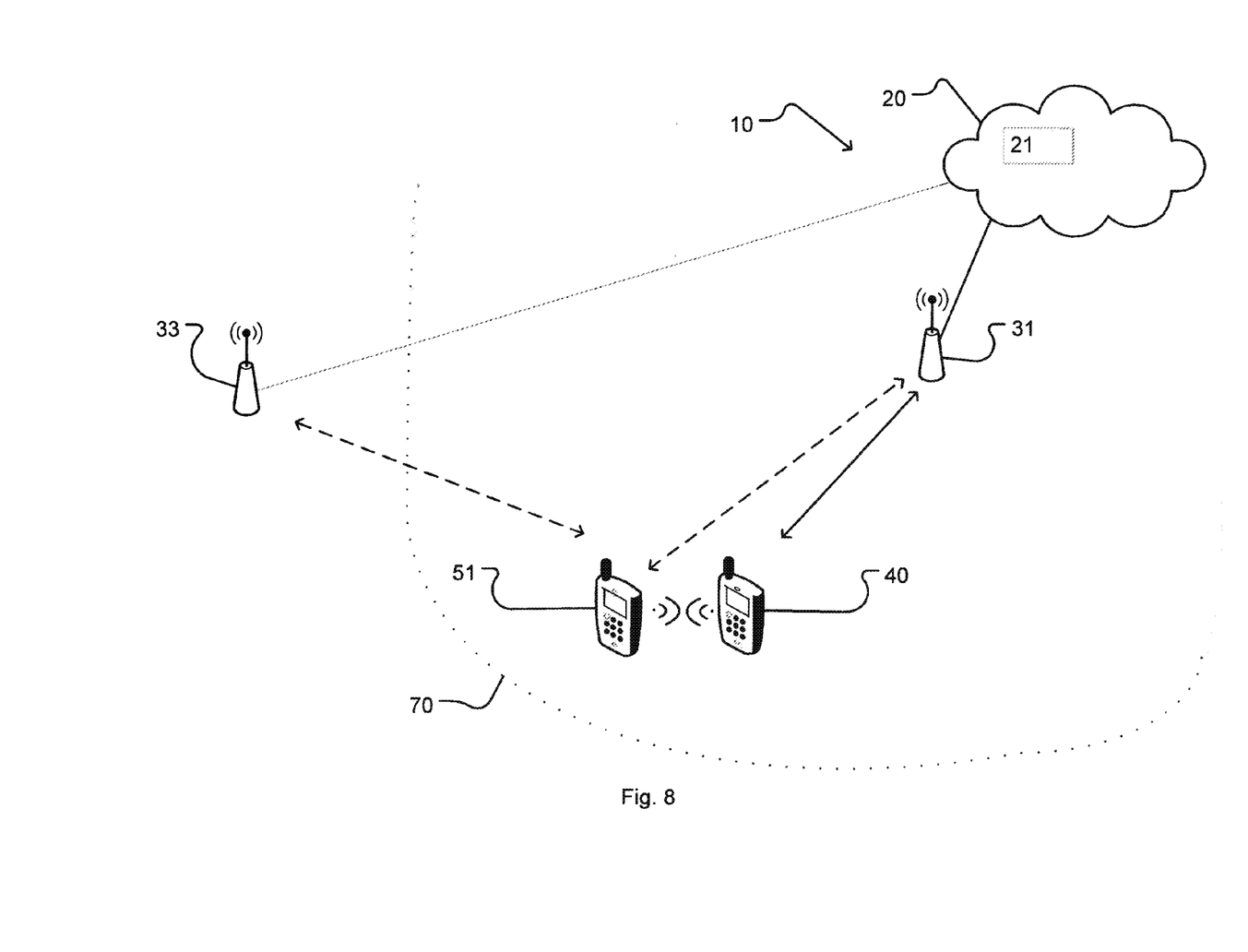
FIG. 8 schematically illustrates authentication of a device, here a mobile phone, in the mobile communication network.

FIG. 8 schematically illustrates the procedure of authenticating a device 51 in the mobile communication network 10 according to another aspect of the invention. This may be a user having a mobile entity, e.g. a smartphone 40 which is authenticated to a mobile communication network. In this embodiment, the user further has a second device with cellular communication capabilities e.g. a tablet 51. The user then wants to attach the tablet 51 to the mobile communications network 10, using the same SIM, without moving the SIM to the tablet 51.

The tablet 51 comprises a network communication unit and tagging circuit. The mobile entity 40 is authenticated to the mobile communication network. In this example the mobile entity is attached to the mobile communications network using base station 31. The authentication is initiated by the mobile entity 40 establishing a connection with the tablet 51, using a tagging circuit, as shown in FIG. 8. In this example the tagging circuit is a NFC tagging circuit. When using NFC, the connection is initiated by bringing the mobile entity 40 in close proximity of the tablet 51.

When the mobile entity 40 has established a connection with the tablet 51, authentication data is exchanged between the mobile entity and the device. This may typically be done by sharing at least one authentication key e.g. Ik and Ck as disclosed in FIG. 5a or 5b.

A network identifier may also be exchanged. The network identifier is information defining the network to authenticate to. In this case the network identifier could specify an operator, a particular network, a domain or a cell of a cellular network.

The device 51 is then authenticated to the mobile communication network by submission of exchanged authentication data in the mobile communication network.

Authentication may be performed when establishing a connection between the device and the mobile communication network by submitting an identity and at least one authentication key, as shown by the dotted line in FIG. 3.

By using a mobile entity associated with a user subscription for communication with the mobile communication network 10 to tag a tablet 51 as described above, the device is enabled to use the same SIM as the mobile entity 40.

The invention claimed is:

1. A method for authenticating a device to a mobile communication network using a mobile entity, the device comprising a first network communication unit and first tagging circuit and the mobile entity comprising a second network communication unit and a second tagging circuit and being authenticated to the mobile communication network, said method comprising:

the mobile entity receiving, via the second tagging circuit, an identifier transmitted by the device using the first tagging circuit, the identifier being a device identifier identifying the device; and authenticating the device to the mobile communication network using the received device identifier, wherein the authenticating step comprises the mobile entity using the second network communication unit to transmit to the mobile communication network an authentication message comprising the device identifier, wherein the mobile entity is one of: a mobile phone, a smartphone, and a tablet, an access list comprising a set of device identifiers is stored in the mobile communication network, the mobile communication network comprises a first base station and a second base station having a shorter range than the first base station, the mobile entity transmits the authentication message to the first base station, which causes the mobile communication network to update the access list to include the device identifier, and the device is configured to access the mobile communication network via the second base station.

2. The method according to claim 1, wherein the mobile entity is associated with a user subscription for communication with the mobile communication network and wherein said authentication enables the device to use the same subscription.

3. The method according to claim 1, wherein the device identifier is a media access control (MAC) address assigned to the device.

4. The method according to claim 1, wherein the tagging circuit is near field communication circuit.

5. The method according to claim 1, wherein the authentication data is only valid for a predefined time.

6. A computer program product comprising a non-transitory computer readable medium storing instructions that when executed by a processing unit in a mobile entity causes the mobile entity to perform the method steps defined in claim 1.

7. The method of claim 1, further comprising:

the mobile communication network storing an access list comprising a set of device identifiers;

the mobile communication network receiving the authentication message comprising the device identifier; and the mobile communication network, after receiving the authentication message, updating the access list to include the device identifier.

* * * * *